(12) United States Patent
Turney et al.

(10) Patent No.: US 11,060,461 B2
(45) Date of Patent: Jul. 13, 2021

(54) FUEL SYSTEMS HAVING REDUCED BYPASS FLOW

(71) Applicant: Hamilton Sundstrand Corporation, Charlotte, NC (US)

(72) Inventors: Joseph Turney, Amston, CT (US); Peter At Cocks, South Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 174 days.

(21) Appl. No.: 16/218,865

(22) Filed: Dec. 13, 2018

(65) Prior Publication Data

US 2020/0191058 A1 Jun. 18, 2020

(51) Int. Cl.
*F02C 7/236* (2006.01)
*F02C 9/30* (2006.01)
*F02C 9/26* (2006.01)

(52) U.S. Cl.
CPC .............. *F02C 7/236* (2013.01); *F02C 9/263* (2013.01); *F02C 9/30* (2013.01); *F05D 2260/231* (2013.01); *F05D 2260/85* (2013.01); *F05D 2270/112* (2013.01); *F05D 2270/20* (2013.01); *F05D 2270/335* (2013.01)

(58) Field of Classification Search
CPC .. F02C 7/22; F02C 7/232; F02C 7/236; F02C 7/26; F02C 7/262; F02C 7/28; F02C 9/26; F02C 9/28; F02C 9/30; F23K 5/04; F23K 5/142; F05D 2260/85; F01D 19/00
See application file for complete search history.

(56) References Cited

U.S. PATENT DOCUMENTS

| | | | | |
|---|---|---|---|---|
| 2,916,875 A | * | 12/1959 | Morley | F02C 7/224 60/39.281 |
| 3,664,509 A | * | 5/1972 | Grill | F04C 11/006 210/391 |
| 4,205,945 A | * | 6/1980 | Davis | F02C 7/236 417/202 |
| 4,339,917 A | * | 7/1982 | LaGrone | F02C 7/236 137/565.32 |

(Continued)

FOREIGN PATENT DOCUMENTS

EP 1726879 A2 11/2006

OTHER PUBLICATIONS

Extended European search report issued in corresponding EP application No. 19216293.1, dated May 4, 2020.

*Primary Examiner* — Alain Chau
(74) *Attorney, Agent, or Firm* — Locke Lord LLP; Scott D. Wofsy; Daniel J. Fiorello

(57) ABSTRACT

A fuel system for an engine can include a fuel circuit and a primary fuel pump in fluid communication with the fuel circuit and configured to pump fuel to the engine as a function of engine speed. The primary fuel pump is configured to pump insufficient fuel flow to the engine during at least one engine speed or speed range. The system also includes a supplemental fuel pump in fluid communication with the fuel circuit configured to selectively pump fuel to the engine at least during the at least one engine speed or speed range to supplement fuel flow from the primary fuel pump to provide sufficient total fuel flow to the engine during all engine speeds.

14 Claims, 3 Drawing Sheets

(56) References Cited

U.S. PATENT DOCUMENTS

| | | | |
|---|---|---|---|
| 4,864,815 A * | 9/1989 | Cygnor | F02C 7/26 60/786 |
| 5,118,258 A * | 6/1992 | Martin | F02C 7/236 417/3 |
| 5,156,001 A * | 10/1992 | Mouton | F02C 7/14 60/734 |
| 5,495,715 A * | 3/1996 | Loxley | F02C 7/236 417/202 |
| 7,401,461 B2 | 7/2008 | Eick et al. | |
| 8,166,765 B2 | 5/2012 | Baker et al. | |
| 8,276,360 B2 | 10/2012 | Poisson et al. | |
| 8,302,406 B2 | 11/2012 | Baker | |
| 8,418,964 B2 | 4/2013 | LeBlanc et al. | |
| 8,893,466 B2 | 11/2014 | Reuter | |
| 8,991,152 B2 | 3/2015 | Heitz | |
| 9,316,157 B2 | 4/2016 | Ripley et al. | |
| 9,399,953 B2 * | 7/2016 | Ballard | F02C 7/232 |
| 9,453,463 B2 | 9/2016 | Zielinski et al. | |
| 9,500,135 B2 * | 11/2016 | Bader | F02C 7/236 |
| 9,657,643 B2 | 5/2017 | Veilleux, Jr. | |
| 9,885,287 B2 * | 2/2018 | Striker | F02C 9/28 |
| 2006/0266047 A1 * | 11/2006 | Eick | F23R 3/28 60/776 |
| 2008/0289338 A1 * | 11/2008 | Desai | F02C 7/232 60/734 |
| 2009/0199823 A1 * | 8/2009 | Mahoney | F02C 9/30 123/497 |
| 2014/0196463 A1 | 7/2014 | Zielinski et al. | |
| 2016/0076452 A1 * | 3/2016 | Striker | F02C 9/28 60/734 |
| 2017/0167387 A1 | 6/2017 | Weir et al. | |
| 2018/0050812 A1 | 2/2018 | Ribarov et al. | |

\* cited by examiner

FUEL SYSTEMS HAVING REDUCED BYPASS FLOW

BACKGROUND

1. Field

The present disclosure relates to fuel systems, e.g., for aircraft.

2. Description of Related Art

Mechanical fuel pumps in certain fuel systems, e.g., for aircraft turbomachines, are currently coupled to the engine and thus pump as a function of the engine speed. The fuel pump is sized to provide flow for high power conditions (e.g., takeoff or start/windmill), while during most conditions (e.g., cruise, descent) less fuel is needed by the combustor. Current systems recirculate the excess fuel (e.g., the difference between the fuel provided by the pump and what is required by the combustor), which produces significant waste heat. While this reliably guarantees a fuel flow to the engine in all conditions, it greatly reduces the ability of the fuel to be used as a heat sink for other cooling purposes.

Such conventional methods and systems have generally been considered satisfactory for their intended purpose. However, there is still a need in the art for improved fuel systems having reduced bypass flow. The present disclosure provides a solution for this need.

SUMMARY

In accordance with at least one aspect of this disclosure, a fuel system for an engine can include a fuel circuit and a primary fuel pump in fluid communication with the fuel circuit and configured to pump fuel to the engine as a function of engine speed. The primary fuel pump is configured to pump insufficient fuel flow to the engine during at least one engine speed or speed range. The system also includes a supplemental fuel pump in fluid communication with the fuel circuit configured to selectively pump fuel to the engine at least during the at least one engine speed or speed range to supplement fuel flow from the primary fuel pump to provide sufficient total fuel flow to the engine during all engine speeds.

The primary fuel pump can be mechanically driven and can be mechanically connected to the engine such that the primary fuel pump is configured to pump fuel as a function of engine speed. In certain embodiments, the supplemental fuel pump may not be mechanically connected to the engine.

The primary fuel pump and the supplemental fuel pump can be positive displacement pumps. The fuel circuit can include two parallel pump branches. The primary fuel pump and the supplemental fuel pump can be connected in parallel by the two parallel pump branches. The primary fuel pump can be disposed on a first branch of the two parallel pump branches, and the supplemental fuel pump can be disposed on a second branch of the two parallel pump branches.

The supplemental fuel pump can be operatively connected to a turbine disposed in fluid communication with the fuel circuit downstream of the primary fuel pump such that the turbine is configured to be driven by fuel flow from the primary fuel pump. The fuel circuit can include at least two parallel branches downstream of the primary fuel pump. The turbine can be in fluid communication with a first branch of the at least two parallel branches.

The system can include a control valve disposed in fluid communication with a second branch of the at least two parallel branches. The control valve can be configured to selectively allow and/or meter fuel flow therethrough to create a bypass path around the turbine to selectively allow and/or meter flow through the turbine, and thus a speed of the supplemental fuel pump.

The fuel circuit can include a return loop for returning excess fuel flow to the primary fuel pump and/or supplemental fuel pump. The return loop can include a pressure release valve for allowing flow at a predetermined pressure.

The system can include a boost pump in fluid communication with the fuel circuit between a fuel tank and the primary and supplemental fuel pumps. The boost pump can be configured to provide a boost pressure to the primary fuel pump and the supplemental fuel pump. The boost pump can be driven on a common shaft with the primary fuel pump. In certain embodiments, the system can include any other suitable fuel system components as appreciated by those having ordinary skill in the art.

In certain embodiments, the supplemental fuel pump can be driven by an electric motor (e.g., instead of a turbine or any other driving means). The system can include a valve disposed upstream or downstream of the supplemental fuel pump to selectively prevent bypass flow through the supplemental fuel pump when not in use.

In certain embodiments, the engine speed or speed range (e.g., where both the primary and supplemental fuel pumps are used together) can be or include a takeoff engine speed or speed range (e.g., full throttle). The engine speed or speed range can be or include a startup or windmill engine speed or speed range. In certain embodiments, the system can include a control module configured to control the supplemental fuel pump to track a predetermined engine fuel flow requirement to provide a total flow substantially equal to or greater than the predetermined engine fuel flow requirement.

In accordance with at least one aspect of this disclosure, a method for providing sufficient fuel flow to an engine can include pumping a first fuel flow with a primary fuel pump to the engine, the first fuel flow being insufficient for the engine at at least one engine speed or speed range; and pumping a second fuel flow with a supplemental fuel pump to supplement the first fuel flow to provide sufficient flow to the engine during the at least one engine speed or speed range.

Pumping a fuel flow can include driving a turbine connected to the supplemental fuel pump with flow from the primary fuel pump to drive the supplemental fuel pump to provide more flow to the engine than pumped by the primary fuel pump alone. The method can include controlling a control valve on a parallel branch from the turbine to meter an amount of flow through the turbine to control a speed of the supplemental fuel pump to control an amount of total flow.

The method can include controlling a speed of an electric motor connected to the supplemental fuel pump to drive the supplemental fuel pump to provide more flow to the engine than pumped by the primary fuel pump alone. The method can include controlling the speed of the electric motor to control a speed of the supplemental fuel pump to control an amount of total flow. The method can include controlling total flow to track a predetermined engine fuel flow requirement, for example.

In accordance with at least one aspect of this disclosure, a method for providing sufficient fuel flow to an engine (e.g., a turbomachine) can include pumping a fuel flow with a mechanically driven primary fuel pump connected to the engine, and with a supplemental fuel pump not mechanically connected to the engine during at least one engine speed or speed range to provide sufficient flow to the engine. The primary fuel pump or the supplemental fuel pump alone may not be able to provide sufficient fuel to the engine.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
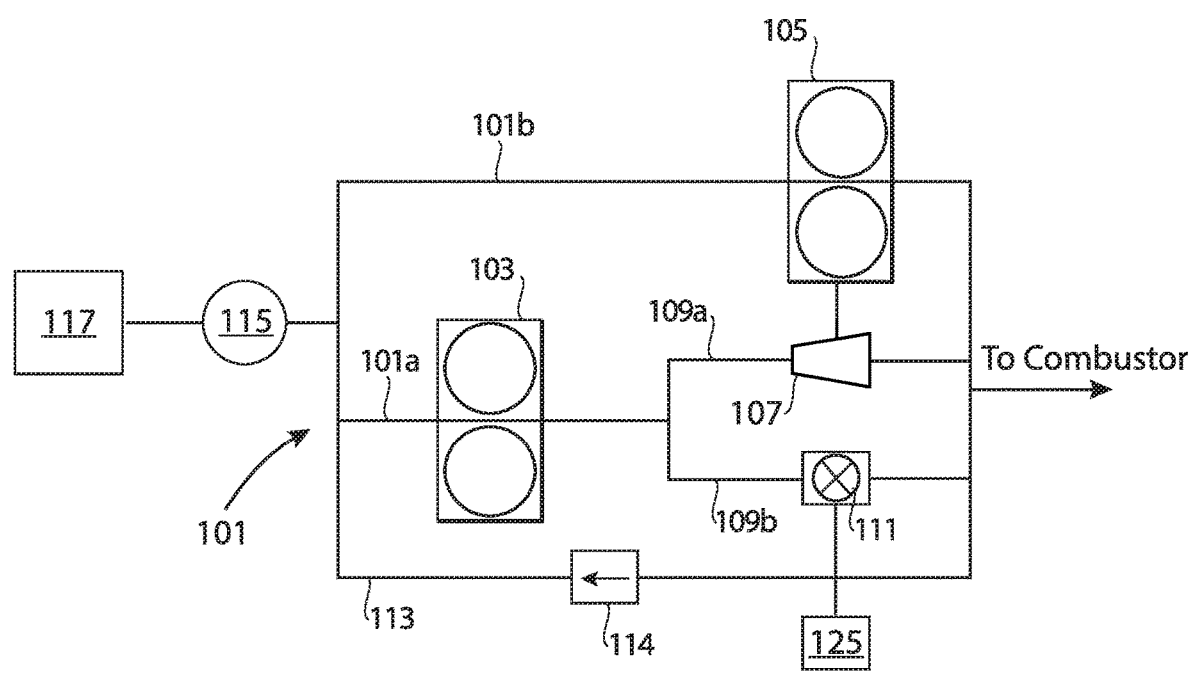
FIG. 1 is a schematic diagram of an embodiment of a system in accordance with this disclosure.
Figure 2:
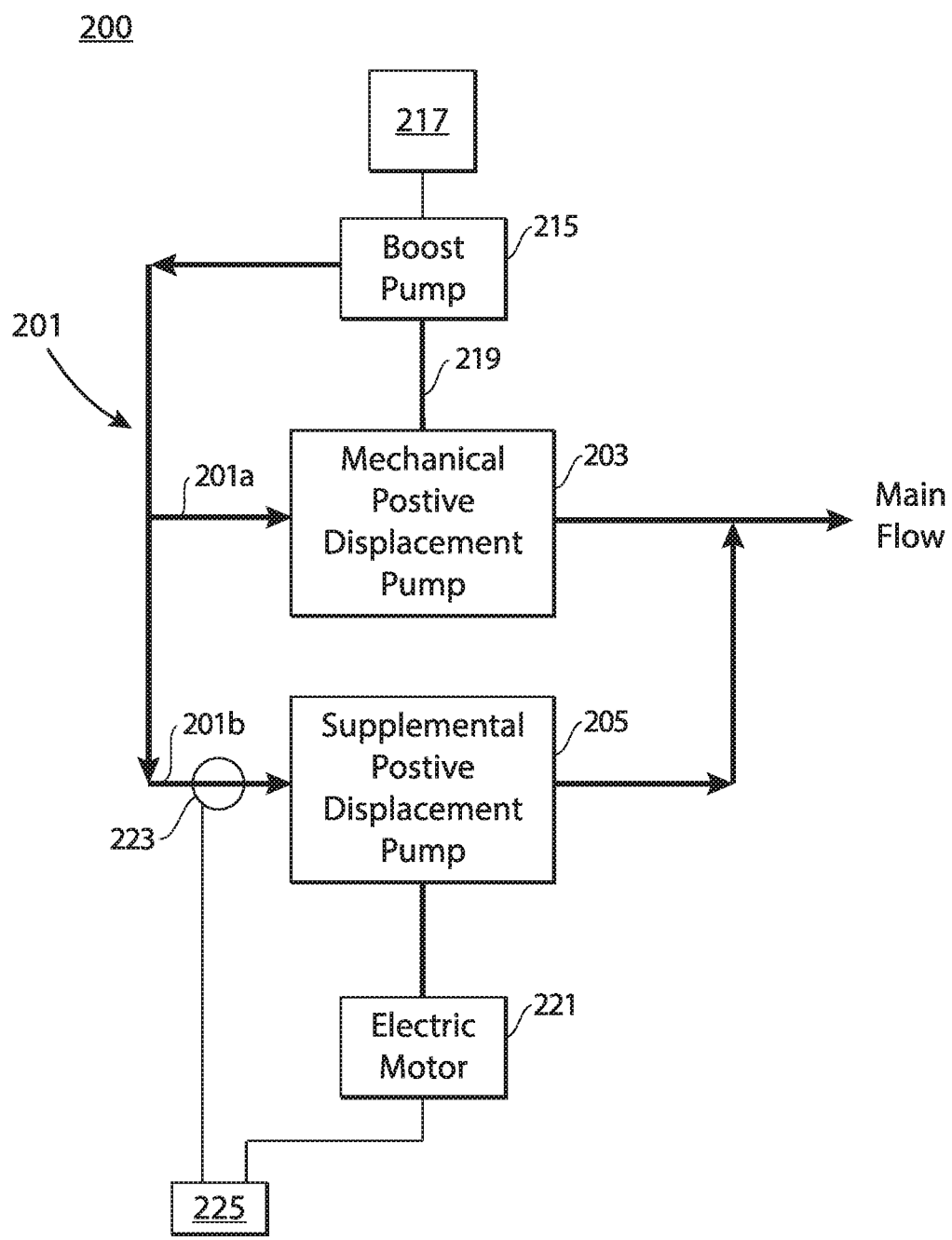
FIG. 2 is a schematic diagram of an embodiment of a system in accordance with this disclosure.
Figure 3:
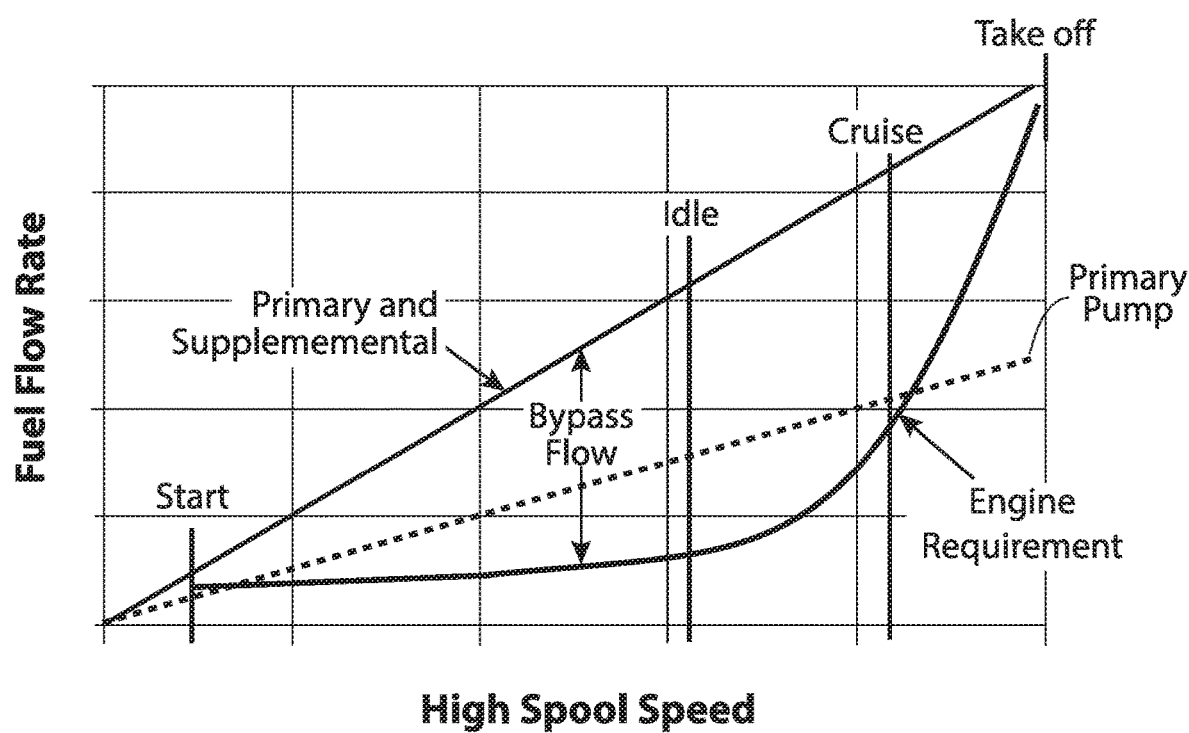
FIG. 3 is a chart showing pump flow vs engine speed of a primary fuel pump, the primary fuel pump plus the supplemental fuel pump, and a curve showing a required amount of flow for the engine.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3. The systems and methods described herein can be used to reduce circulated bypass flow, reducing waste heat addition to the fuel in a fuel circuit, for example, or any other suitable use.

Referring to FIGS. 1 and 2, a fuel system 100, 200 (e.g., of an aircraft) for an engine (e.g., a turbomachine, not shown) can include a fuel circuit 101, 201 and a primary fuel pump 103, 203 in fluid communication with the fuel circuit 101 that is configured to pump fuel to the engine as a function of engine speed. The primary fuel pump 103, 203 can be can be mechanically driven and mechanically connected to the engine in any suitable manner (e.g., via a shaft and/or gearbox) such that the primary fuel pump 103, 203 is configured to pump fuel to the engine as a function of engine speed (e.g., linearly with engine speed). The primary fuel pump 103, 203 is sized such that it cannot alone provide sufficient fuel flow (e.g., it is configured to provide insufficient fuel flow) to the engine during at least one engine speed or speed range.

The system 100, 200 also includes a supplemental fuel pump 105, 205 in fluid communication with the fuel circuit 101, 201 can be configured to selectively pump fuel to the engine at least during the at least one engine speed or speed range to supplement fuel flow from the primary fuel pump 103, 203 to provide sufficient total fuel flow to the engine during all engine speeds. In this regard, the supplemental fuel pump 105, 205 can make up for the inability of the primary fuel pump 103, 203 to pump enough flow (e.g., during start up and/or takeoff). In at least some embodiments, the supplemental fuel pump may not be mechanically connected to the engine.

The primary fuel pump 103, 203 and the supplemental fuel pump 105, 205 can be positive displacement pumps, for example, or any other suitable type of pump. The fuel circuit 101, 201 can include two parallel pump branches 101a, 101b, and 201a, 201b. As shown, the primary fuel pump 103, 203 and the supplemental fuel pump 105, 205 can be connected in parallel by the two parallel pump branches 101a, 101b, and 201a, 201b. The primary fuel pump 103, 203 can be disposed on a first branch 101a, 201a of the two parallel pump branches 101a, 101b and 201a, 201b, and the supplemental fuel pump 105, 205 can be disposed on a second branch 101b, 201b of the two parallel pump branches 101a, 101b, and 201a, 201b.

Referring to FIG. 1, the supplemental fuel pump 105 can be operatively connected to a turbine 107 disposed in fluid communication with the fuel circuit 101 downstream of the primary fuel pump 103 such that the turbine 107 is configured to be driven by fuel flow from the primary fuel pump 103. As shown in FIG. 1, the turbine 107 can drive the supplemental fuel pump 105 as a function of flow through the turbine 107. The fuel circuit 101 can include at least two parallel branches 109a, 109b downstream of the primary fuel pump 103. The turbine 107 can be in fluid communication with a first branch 109a of the at least two parallel branches 109a, 109b.

The system 100 can include a control valve 111 disposed in fluid communication with a second branch 109b of the at least two parallel branches 109a, 109b. The control valve 111 can be configured to selectively allow and/or meter fuel flow therethrough to create a bypass path around the turbine 107 to selectively allow and/or meter flow through the turbine 107. This in turn controls the speed of the supplemental fuel pump 105. For example, the more closed the control valve 111 is, the more flow will flow through turbine 107, and the more supplemental fuel pump 105 will pump fuel.

The fuel circuit 101 can include a return loop 113 for returning excess fuel flow to the primary fuel pump 103 and/or supplemental fuel pump 105. The return loop 113 can include a pressure release valve 114 for allowing flow at a predetermined pressure. It is contemplated that no return loop 113 is necessary in certain embodiments wherein the primary and supplemental fuel pumps 103, 105 are sized and controlled such that a sufficient, but not excess, amount of a fuel is pumped to the engine under all conditions.

As shown in FIGS. 1 and 2, the system 100, 200 can include a boost pump 115, 215 in fluid communication with the fuel circuit 101, 201 between a fuel tank 117, 217 and the primary and supplemental fuel pumps 103, 203, 105, 205. The boost pump 115, 215 can be configured to provide a boost pressure to the primary fuel pump 103, 203 and the supplemental fuel pump 105, 205. As shown in FIG. 2, the boost pump 115, 215 can be driven on a common shaft 219 with the primary fuel pump 103, 203 that is mechanically connected to the engine. In certain embodiments, the system 100, 200 can include any other suitable fuel system components (e.g., heat exchangers, valves, return to tank lines in the fuel circuit to circulate excess flow, etc.) as appreciated by those having ordinary skill in the art.

Referring to FIG. 2, in certain embodiments, the supplemental fuel pump 203 can be driven by an electric motor 221 (e.g., instead of a turbine or any other driving means). The system 200 can include a valve 223 (e.g., a shutoff valve) disposed upstream and/or downstream of the supplemental fuel pump 205 to selectively prevent bypass flow through the supplemental fuel pump 205 when not in use. In certain embodiments, the resistance against turning in the supplemental fuel pump 205 and/or the electrical motor 221 can be sufficient to prevent flow from pushing through the supplemental fuel pump 205 when not in use.

In certain embodiments, the engine speed or speed range (e.g., where both the primary and supplemental fuel pumps are used together) can be or include a takeoff engine speed or speed range (e.g., full throttle). The engine speed or speed range can be or include a startup or windmill engine speed or speed range. In certain embodiments, the system 100, 200 can include a control module 125, 225 configured to control the supplemental fuel pump 205 (e.g., via controlling control valve 111, or electric motor 221). The control module 125, 225 can include any suitable hardware and/or software modules to perform any suitable function and/or method of this disclosure.

For example, referring to FIG. 3, the control module 125, 225 can be configured to track a predetermined engine fuel flow requirement, e.g., to provide a total flow substantially equal to or greater than the predetermined engine fuel flow requirement through all operational speeds/flight phases. For example, as shown in FIG. 3, the primary pump line shows that the primary pump 103, 203 cannot pump enough above a cruise power setting as it crosses the engine requirement curve before the maximum of the engine requirement line. To produce enough flow, the control module 125, 225 can cause the supplemental pump to provide supplemental flow to add to the primary flow to cause the primary and supplemental line to rise above the engine requirement curve. In certain embodiments, the control module 125, 225 can be configured to operate the supplemental fuel pump 105, 205 to at least partially match the primary and supplemental flow line to the curve of the engine requirement curve (e.g., at and above the point where the primary line intersects the engine requirement curve).

Embodiments can include any suitable sensor(s) (e.g., connected to controller 101) to sense if flow is going through pressure relief valve 114, for example, and/or to measure the flow going back to the tank 117, and/or to measure pressure on fuel nozzles for sufficiency, or any other suitable sensor. In certain embodiments, the controller 125, 225 can control the supplemental fuel pump 105, 205 to provide the right amount of pressure to fuel the engine and while creating little to no back flow, for example. In certain embodiments, the controller 125, 225 can be open loop to control based on stored data regarding engine requirements (e.g., using data of FIG. 3 for example).

While a single supplemental pump is described above, it is contemplated that any suitable number of supplemental pumps can be used (e.g., more than one) and/or controlled independently or dependently of each other. Embodiments having multiple independent supplemental pumps may allow for even smaller sizing of the primary fuel pump (which can be limited to having linear flow line as shown in FIG. 3) which can allow more accurate tracking of the engine requirement curve. In certain embodiments, the engine requirement curve can be matched completely by the controller to substantially eliminate excess flow and reduce the addition of waste heat to the fuel.

In accordance with at least one aspect of this disclosure, a method for providing sufficient fuel flow to an engine can include pumping a first fuel flow with a primary fuel pump to the engine, the first fuel flow being insufficient for the engine at at least one engine speed or speed range; and pumping a second fuel flow with a supplemental fuel pump to supplement the first fuel flow to provide sufficient flow to the engine during the at least one engine speed or speed range.

Pumping a fuel flow can include driving a turbine connected to the supplemental fuel pump with flow from the primary fuel pump to drive the supplemental fuel pump to provide more flow to the engine than pumped by the primary fuel pump alone. The method can include controlling a control valve on a parallel branch from the turbine to meter an amount of flow through the turbine to control a speed of the supplemental fuel pump to control an amount of total flow.

The method can include controlling a speed of an electric motor connected to the supplemental fuel pump to drive the supplemental fuel pump to provide more flow to the engine than pumped by the primary fuel pump alone. The method can include controlling the speed of the electric motor to control a speed of the supplemental fuel pump to control an amount of total flow. The method can include controlling total flow to track a predetermined engine fuel flow requirement, for example.

In accordance with at least one aspect of this disclosure, a method for providing sufficient fuel flow to an engine (e.g., a turbomachine) can include pumping a fuel flow with a mechanically driven primary fuel pump connected to the engine, and with a supplemental fuel pump not mechanically connected to the engine during at least one engine speed or speed range to provide sufficient flow to the engine. The primary fuel pump or the supplemental fuel pump alone cannot provide sufficient fuel to the engine.

Any other suitable methods and/or portions thereof are contemplated herein. Any suitable embodiment(s) of a method and/or portion(s) thereof can be stored as computer executable instructions (e.g., in a non-transitory computer readable medium) and executed by a suitable controller (e.g., a FADEC) or other suitable computing device.

Embodiments include two constant volume (e.g., gear) pumps, a primary pump being mechanically connected, e.g., to the accessory gear box (driven by high spool) of a turbomachine and the supplemental being connected to a turbine or electric motor, for example. When the primary pump is sufficient to supply the total fuel flow (e.g., at cruise), the control valve can be open or the electric motor shut off and the supplemental pump does not operate or provides little flow. When additional flow is needed, the control valve is modulated to force part or all of the flow from the primary pump through the turbine, or the electric motor is turned on to drive the supplemental pump.

In the turbine embodiments, using constant volume pumps, the primary pump can easily provide enough pressure to provide useful work to the turbine to drive the supplemental pump providing the additional flow required. Embodiments can include a pressure relief valve to protect against over-pressure. Embodiments having an electrically driven fuel pump allow the pump speed and engine speed to be decoupled, thus enabling the pump speed, and therefore flow, to be matched to engine demand.

Embodiments include reliable, mechanical primary pumps that are sized to provide sufficient flow for the majority of the mission without being vastly oversized at cruise, for example. This reduces wasted energy and unnecessary heating of the fuel. This reduction in waste heat enables the fuel to be utilized for cooling of other aircraft or engine heat loads, which improves the overall aircraft thermal management system efficiency, size and weight. Certain embodiments also enable a small reduction in the parasitic horsepower extraction to drive the fuel pump.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel system for an engine, comprising:
a fuel circuit;
a primary fuel pump in fluid communication with the fuel circuit configured to pump insufficient fuel flow to the engine for running the engine at least one engine speed or speed range, wherein the primary fuel pump is mechanically driven and mechanically connected to the engine such that the primary fuel pump is configured to pump fuel as a function of engine speed;
a supplemental fuel pump in fluid communication with the fuel circuit that is configured to selectively pump fuel to the engine at least during the at least one engine speed or speed range to supplement fuel flow from the primary fuel pump to provide sufficient total fuel flow to the engine for running the engine at all engine speeds, wherein the supplemental fuel pump is not mechanically connected to the engine, wherein the supplemental fuel pump is operatively connected to a turbine disposed in fluid communication with the fuel circuit downstream of the primary fuel pump such that the turbine is configured to be driven by fuel flow from the primary fuel pump, wherein the fuel circuit further comprises at least two parallel branches downstream of the primary fuel pump, wherein the turbine is in fluid communication with a first branch of the at least two parallel branches; and a control valve disposed in fluid communication with a second branch of the at least two parallel branches, wherein the control valve is configured to selectively allow and/or meter fuel flow therethrough to create a bypass path around the turbine to selectively allow and/or meter flow through the turbine, and thus control a speed of the supplemental fuel pump, wherein the control valve is configured to shut off flow in the second branch to control fuel flow to the turbine, wherein the primary fuel pump is connected via the first branch to the turbine without a valve therebetween to provide uninterrupted flow to the turbine, and wherein the first branch and the second branch both lead to a combustor of the engine.

2. The fuel system of claim 1, wherein the primary fuel pump and the supplemental fuel pump are positive displacement pumps.

3. The fuel system of claim 1, wherein the fuel circuit includes two parallel pump branches, wherein the primary fuel pump and the supplemental fuel pump are connected in parallel by the two parallel pump branches, wherein the primary fuel pump is disposed on a first branch of the two parallel pump branches, and wherein the supplemental fuel pump is disposed on a second branch of the two parallel pump branches.

4. The fuel system of claim 1, wherein the fuel circuit includes a return loop for returning excess fuel flow to the primary fuel pump and/or supplemental fuel pump, wherein the return loop includes a pressure release valve for allowing flow at a predetermined pressure.

5. The fuel system of claim 1, further comprising a boost pump in fluid communication with the fuel circuit between a fuel tank and the primary and supplemental fuel pumps, the boost pump configured to provide a boost pressure to the primary fuel pump and the supplemental fuel pump.

6. The fuel system of claim 5, wherein the boost pump is driven on a common shaft with the primary fuel pump.

7. The fuel system of claim 1, wherein the supplemental fuel pump is driven by an electric motor.

8. The system of claim 7, further comprising a valve disposed upstream or downstream of the supplemental fuel pump to selectively prevent bypass flow through the supplemental fuel pump when not in use.

9. The system of claim 1, wherein the engine speed or speed range is a takeoff engine speed or speed range.

10. The system of claim 1, wherein the engine speed or speed range is a startup or windmill engine speed or speed range.

11. The system of claim 1, further comprising a control module configured to control the supplemental fuel pump to track a predetermined engine fuel flow requirement to provide a total flow substantially equal to or greater than the predetermined engine fuel flow requirement.

12. A method for providing sufficient fuel flow to an engine, comprising:
pumping a first fuel flow with a primary fuel pump to the engine, the first fuel flow being insufficient for running the engine at least one engine speed or speed range; and
pumping a second fuel flow with a supplemental fuel pump to supplement the first fuel flow to provide sufficient flow to the engine for running the engine at the at least one engine speed or speed range, wherein pumping the first and the second fuel flow includes driving a turbine connected to the supplemental fuel pump with fuel flow from the primary fuel pump to drive the supplemental fuel pump to provide more fuel flow to the engine than pumped by the primary fuel pump alone; and
controlling a control valve on a parallel branch from the turbine to meter an amount of fuel flow through the turbine to control a speed of the supplemental fuel pump to control an amount of total fuel flow, wherein the control valve is configured to shut off fuel flow in the second branch to control fuel flow to the turbine, wherein the primary fuel pump is connected via the first branch to the turbine without a valve therebetween to provide uninterrupted fuel flow to the turbine, and wherein the first branch and the second branch both lead to a combustor of the engine.

13. The method of claim 12, further comprising controlling total flow to track a predetermined engine fuel flow requirement.

14. The method of claim 12, further comprising controlling a speed of an electric motor connected to the supplemental fuel pump to drive the supplemental fuel pump to provide more flow to the engine than pumped by the primary fuel pump alone.

* * * * *